March 28, 1944. L. F. HAGEMAN Re. 22,460

STRIP FEED FOR TYPEWRITING MACHINES

Original Filed Dec. 9, 1939 4 Sheets-Sheet 1

INVENTOR
LOUIS F. HAGEMAN,
BY
Carl W. Weeks
ATTORNEY

March 28, 1944. L. F. HAGEMAN Re. 22,460

STRIP FEED FOR TYPEWRITING MACHINES

Original Filed Dec. 9, 1939 4 Sheets-Sheet 2

INVENTOR
LOUIS F. HAGEMAN,
BY Carl W. Wiehl,
ATTORNEY

March 28, 1944. L. F. HAGEMAN Re. 22,460

STRIP FEED FOR TYPEWRITING MACHINES

Original Filed Dec. 9, 1939 4 Sheets-Sheet 3

INVENTOR
LOUIS F. HAGEMAN,
BY Karl W. Weeks
ATTORNEY

March 28, 1944. L. F. HAGEMAN Re. 22,460

STRIP FEED FOR TYPEWRITING MACHINES

Original Filed Dec. 9, 1939 4 Sheets-Sheet 4

INVENTOR
LOUIS F. HAGEMAN,
BY Carl W. Weeks,
ATTORNEY

Reissued Mar. 28, 1944

Re. 22,460

UNITED STATES PATENT OFFICE 22,460

STRIP FEED FOR TYPEWRITING MACHINES

Louis F. Hageman, Niagara Falls, N. Y., assignor to American Sales Book Company, Inc., Niagara Falls, N. Y., a corporation of Delaware Original No. 2,300,276, dated October 27, 1942, Serial No. 308,438, December 9, 1939. Application for reissue January 21, 1943, Serial No. 473,081

7 Claims. (Cl. 197—134)

This invention relates to improvements in typewriting and similar inscribing means, and more particularly to improvements in the mechanism for feeding the record strips into writing position and for feeding the carbon or transfer strips into transfer position with reference to the record strips.

It is a general object of the invention to provide an improved feeding mechanism for the record strips and also an improved feeding mechanism for the transfer or carbon strips, assuring at all times sufficient carbon material in transfer position, so that the transfer inscriptions are always full and easily readable.

A further and more particular object of the invention is to provide an improved differential feed mechanism for feeding the carbon strips at a slower rate of speed than the feeding movement of the record strips, thus assuring clear, legible transfer copies at all times and, at the same time, utilizing substantially all of the transfer material of the transfer strips, and economizing in the use thereof.

A further object of the invention is to provide for machines of the class mentioned an improved strip feeding mechanism for drawing the record strips by tractive effort into writing position on a writing platen of the flat stationary type.

A further object is to provide for a differential feeding mechanism for transfer strips, an improved releasing connection or coupling for setting the feed in different driving positions, and providing for the return of the transfer strip supply carriage to its initial position after it has been moved forwardly by the differential feeding mechanism.

Still another object of the invention is to provide an improved equalizing mechanism for equalizing the movements of the transfer strip supply carriage as it is fed forwardly to effect feeding movement of the transfer strips, and to avoid binding or skewing of the carriage during its feeding movements.

Other objects of the invention will be in part pointed out in the following detailed description of an illustrative but preferred embodiment of the invention, and will be in part obvious in connection therewith.

The invention accordingly comprises the features of construction, combination of elements, and arrangement of parts which will be exemplified in the construction hereinafter set forth and the scope of the application of which will be indicated in the claims.

For a more comprehensive disclosure of the nature, objects and advantages of the invention, reference is had to the following detailed description of the illustrative embodiment, and to the accompanying drawings in which.

Figure 4:
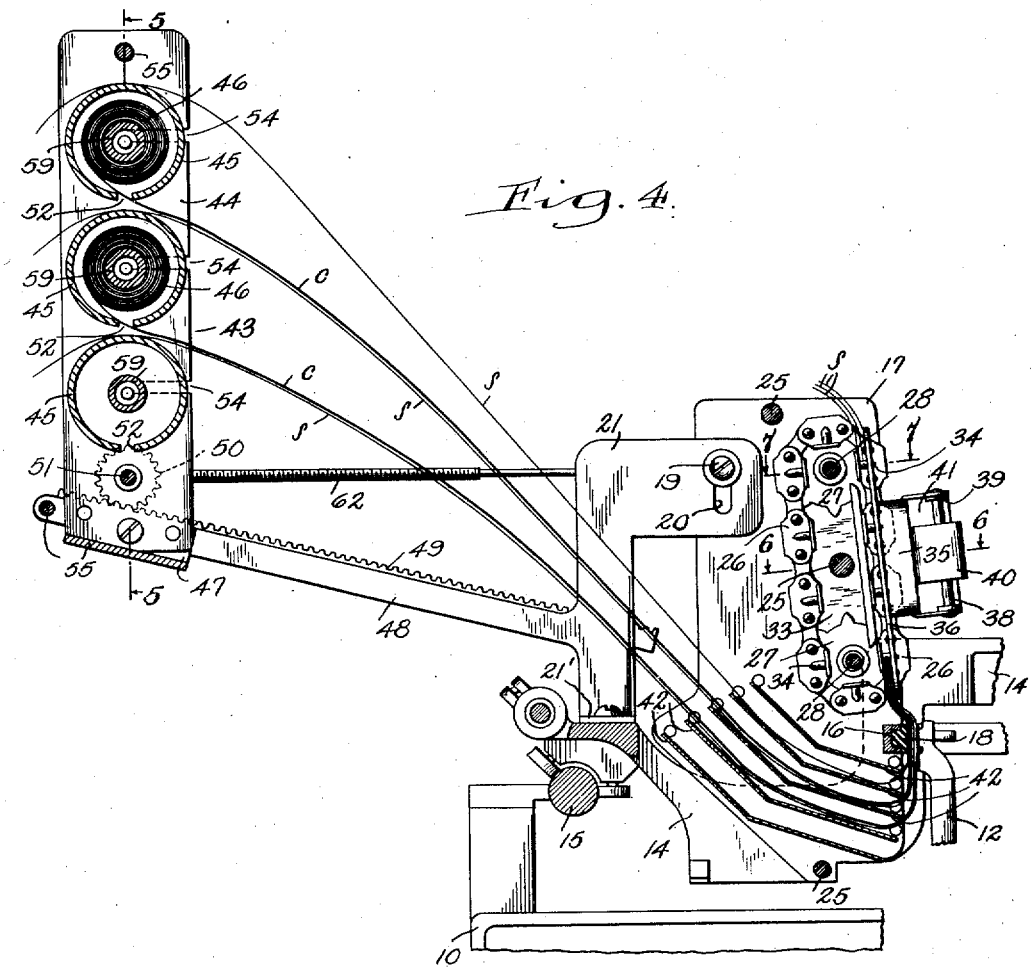
Fig. 4 is a vertical sectional view taken substantially centrally of Fig. 3, looking toward the right in Fig. 3.

Referring to the specification for a detailed description of the embodiment there shown, the improvements have been incorporated in a typewriting machine of generally known construction including a frame 10 having a keyboard 11 provided with operating keys for operating the type bars, one of which is shown at 12 in Fig. 4. Keys may also be provided for operation of the platen carriage and for other purposes that need not be herein described. A release key 13 is connected to the platen carriage of the machine for releasing the carriage to movement in letter spacing direction.

Mounted in the upper part of the typewriter frame is the platen carriage 14 mounted for transverse movements of the typewriter frame for letter spacing as by means of supporting rolls 15 in well known manner. A platen 16 is attached firmly in operative position on the carriage 14 being preferably connected at its opposite ends to the supporting end plates 17 of the carriage. The platen carriage includes a separate unit or frame including the end plates 17 carrying the platen 16 and movable vertically for bringing type characters into alignment with the platen as later described. This platen, as shown, is preferably of the stationary type having a surface for supporting the record strips in writing position adjacent to the type of the type bars 12.

This platen may be provided with a striking surface adapted to yield slightly upon impact of the type bars. This surface, as shown, is provided by means of a facing 18 that may be constructed of hard rubber or similar firm resilient material. The striking surface of the platen need be only of sufficient width to accommodate the type, its diameter being only slightly greater than the height or length of type forming each character.

The separate unit or frame of the platen carriage is mounted for vertical movements in the main part of said carriage so as to position the platen opposite to the upper characters of the type bars when the carriage unit is raised, and opposite to the lower characters when the unit is lowered. This vertical movement is provided for by supporting lugs 19 attached to the end frames or plates 17 and engaging in vertically elongated slots 20 in supporting brackets 21 attached to the platen carriage by supporting members 21′ and movable therewith in letter spacing direction. The vertically movable frame or unit of the platen carriage is supported in its lowermost position by means of supporting lugs 22 and is raised from this position by means of actuating levers 23 engaging with supporting pins 24 connected to the end plates 17. These actuating levers may be operated to move the vertically movable unit or frame of the platen carriage upwardly and downwardly by connections to one of the keys of the keyboard 11 in a manner well understood in the art.

It will be noticed that the entire platen carriage is movable transversely of the typewriter frame on the supporting rails 15 for letter spacing, whereas the platen unit or frame including the supporting end plates 17 is movable vertically upon the main part of the platen frame for bringing the platen into alignment with the upper and lower characters of the type bars. The two opposite supporting plates 17 may be appropriately connected together to provide a unitary platen frame by means of transverse tie rods 25.

Record strip feeding mechanism is provided for feeding the record strips into inscription receiving position adjacent to the platen 16. As shown, this feeding mechanism includes two laterally spaced flexible feeding units or feed chains 26 having pivotally connected links and being mounted upon rotary sprockets 27, one of which is a driving sprocket. This feeding mechanism, as shown, is mounted upon the vertically movable platen unit or frame and is positioned above or beyond the platen 16 in the path of strip feed for pulling the record strips with a tractive effort across the writing surface of the platen. Any number of record strips from one or two to six or eight, or more, may thus be fed over the writing platen and it will be noticed that the parts of the strips adjacent to the platen are free from extraneous pressure so that the carbon strip or strips may be fed relatively to the record strips to bring different parts thereof into transfer position as later more fully described.

The driving sprocket wheels 27 for the feed chains 26 are mounted upon rotary shafts 28, one of which, as for example the upper shaft, is provided with an operating extension positioned outside of the adjacent supporting plate 17 and provided with an operating knob or handle 29, by means of which the feed chains may be operated to feed the record strips. The operating means may be provided with a clutch 30 and a toothed wheel 31, with which engages a roller mounted upon a spring pressed arm 32 for effecting step by step feeding action in measured amounts for the purpose of line spacing. Since this step by step feeding action is not specifically a part of the present invention it need not be further described.

Figure 6:
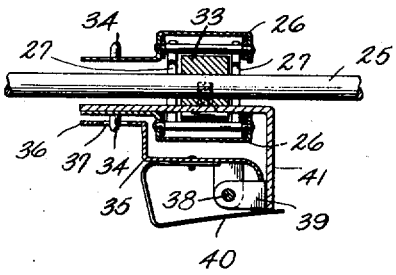
Fig. 6 is a fragmentary sectional view taken substantially on the line 6—6 of Fig. 4.
Figure 7:
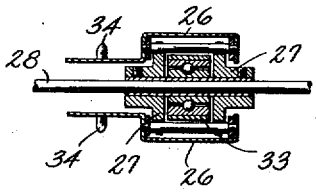
Fig. 7 is a detailed sectional view taken substantially on the line 7—7 of Fig. 4.

As shown in Figs. 4 and 6 supporting plates or brackets 33 are connected to one of the transverse tie rods 25, one bracket for each of the flexible pin feed elements 26. These brackets 33 extend between the two opposite sprockets 27 so as to provide a rigid frame unit. This structure is fully described in the Mabon Patent No. 2,171,003, issued August 29, 1939, and, therefore, need not be described in detail herein. Also, the feed pins 34 of the feed chains are, as shown, preferably mounted so that the strip engaging feed transmitting parts thereof are disposed substantially below the pitch line of the feed chain; also, as fully described in the Mabon patent referred to. This mounting of the pins provides for more accurate feeding and positioning of the record strips as fully set forth in said prior patent.

A strip guiding and retaining member 35 is adapted to engage the record strips adjacent the path of engagement therewith by the feed pins 34, as best shown in Figs. 4 and 6. The strip guide 35 has an elongated guide plate 36 adapted to engage the surface of the strips and having an elongated slot 37 in which the feed pins run. The strip guide 35 is mounted for pivotal movement at 38 on a bracket 39 and is provided with a leaf spring 40 secured thereto, engaging a part of the bracket 39 so as to tend to urge the guide into its normal operative strip guiding position as shown in Fig. 6. During threading of the strips into feeding relation with the feed pins, the guide may be swung away from the pins upon its pivot 38 and is held in its raised position by engagement of the end of the leaf spring 40 with the flat surface of the bracket plate 41.

Strip guiding plates 42 are connected to the lower ends of the end plates 17 of the vertically movable platen unit or frame, extending transversely across the strip path adjacent to the platen 16 and spaced apart slightly so as to provide guiding channels for the reception of the record and transfer strips to guide the latter into writing position with reference to the platen. These guide plates 42 may be appropriately attached in position to the end plates 17.

The carbon supply carriage 43 embodies an upright frame including upright end plates or brackets 44 between which are the housings or spools 45 for the carbon supply rolls 46. At their lower ends the end brackets 44 of the carbon carriage are provided with guiding and supporting members or blocks 47 having channels on their outer surface for slidably receiving the supporting rails 48. The channel blocks 47 receive the rails 48 in close relation so as to provide slides providing for movement of the carbon carriage toward and away from the writing platen 16. Also, engagement of these channel supporting members 47 with the supporting rails 48 function to maintain the carbon carriage in substantially upright position as seen in Fig. 4. The supporting rails 48 are preferably attached in operative position as shown in Fig. 4 being attached to and supported by the supporting brackets 21, and they may be integral therewith as shown. These rails extend rearwardly from the supporting brackets in laterally spaced relation. As shown, it is desirable in some cases that these supporting rails incline downwardly toward the platen carriage so as to facilitate feeding movement of the carbon carriage, as will appear more clearly as the description proceeds.

An equalizing device for the carbon carriage 43 is preferably provided for equalizing the movements of the opposite sides of the carriage along the supporting rails and to avoid skewing and obstruction to feeding movements. As shown, this equalizing device includes racks or rack-bars 49, shown as being connected to and extending along the respective supporting rails 48. Engaging with the teeth of the rack bars are toothed pinions 50 firmly attached to and rotating as a unit with the rotary shaft 51 mounted in the end plates or brackets 44. The pinions 50 are thus constrained to rotate as a unit so that any tendency of one end of the carriage to move ahead or behind the other end is compensated or equalized by this equalizing connection. Freedom of movement of the carriage along the supporting rails is thus assured and binding tendencies are counteracted.

The carbon supply spools or housings 45, as shown, are preferably in the form of metallic cylinders having slots 52 through which the carbon strips extend from the supply rolls 46. The cylinder housings are provided at their ends with supporting trunnions or pins 53 engaging in supporting slots 54 in the end plates 44. The cylinders thus extend between the plates 44 in supported position. Transverse frame members 55 connect the opposite end brackets 44 providing a frame which is sufficiently rigid for supporting the carbon cylinders in position.

Figure 1:
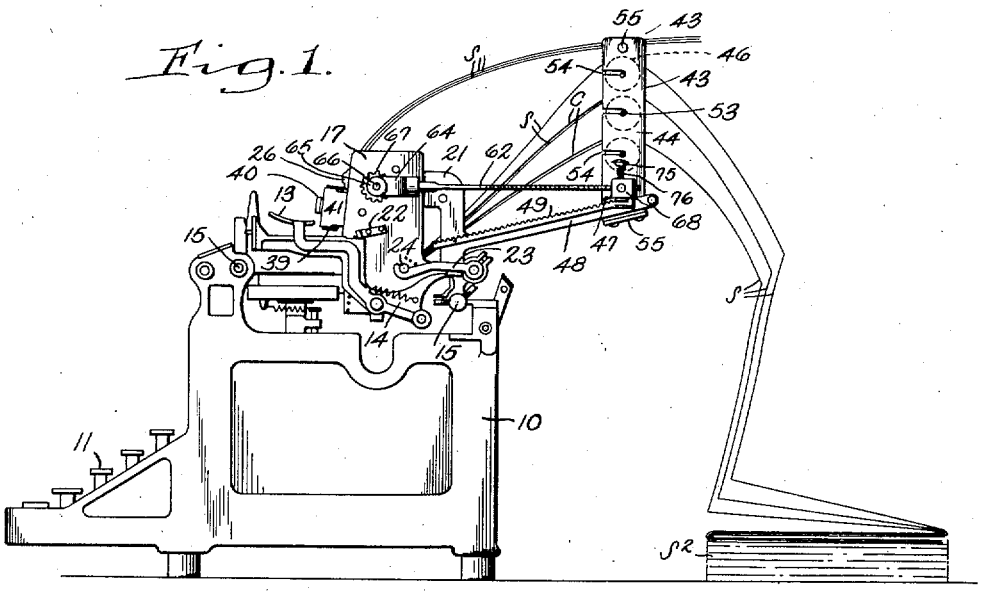
Fig. 1 is an end elevation of a typewriting machine embodying the invention.
Figure 2:
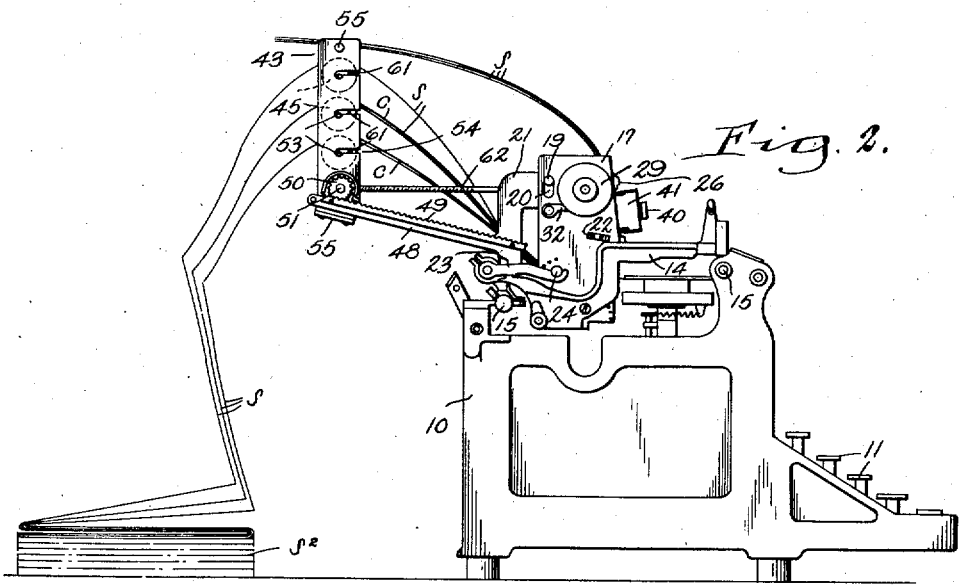
Fig. 2 is an end elevation of the opposite end of the machine shown in Fig. 1.
Figure 3:
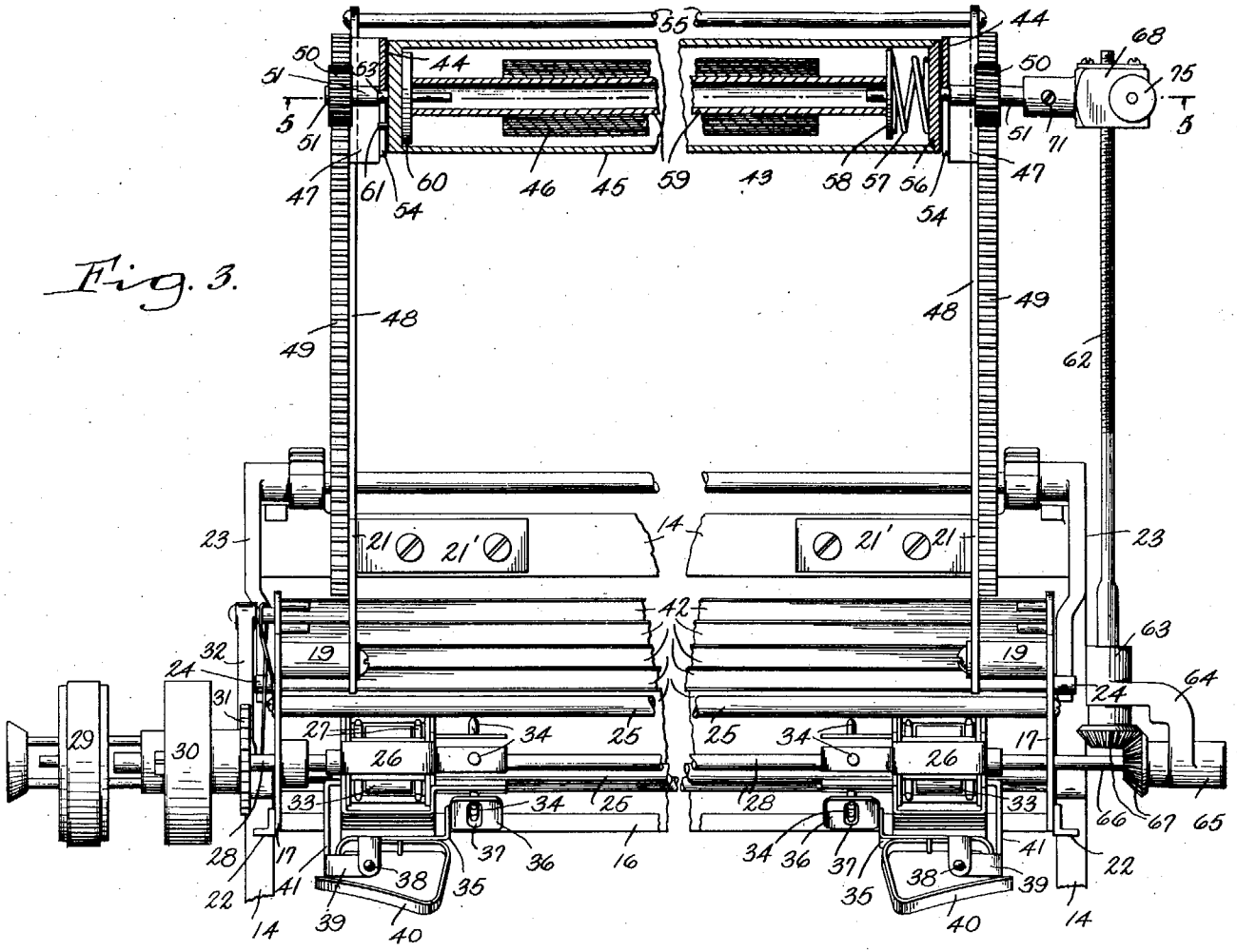
Fig. 3 is an enlarged fragmentary plan view of the machine shown in Figs. 1 and 2, parts being removed, broken away, and in section to reveal the structure and arrangement more clearly.

As shown, in Fig. 3 each carbon cylinder or housing 45 has a removable end piece 56 connected to which is an inner spiral spring 57 having attached at its inner end a disk 58 yieldingly pressed into engagement with the cylindrical core or spool 59 on which the carbon supply 46 is wound. The opposite end of the core 59 has a flange 60 contacting with the adjacent end of the cylinder. The disk 58 is thus yieldingly urged against the end of the core 59 so as to yieldingly resist the withdrawal of the carbon strip from the supply roll by friction of the disk on the core. The carbon cylinders are easily installed in operative position in the slots 54 of the end plates and easily removed therefrom. Each spool is maintained in its normal operative position with the strip exit slot facing downwardly by means of a positioning lug 61 attached to the end of the cylinder and engaging in the slot 54. The yielding friction of the end piece 56 against the plate 44 together with a seat or depression at the inner end of the slot 54 retains the cylinder in its operative position.

The differential feeding mechanism for feeding the transfer strips forwardly at a slower speed than that of the record strips includes a rotatable threaded driving shaft or rod 62 rotatably mounted, one end in a bearing 63 connected to an angular bearing block 64, having a second bearing 65 for the outer end of an integral extension 66 of the driving shaft 28 of the pin feed mechanism for feeding the record strips. Intermeshing bevelled gears 67 firmly mounted upon the shaft extension 66 and the threaded shaft 62 provide for transmission of driving force from the feed shaft 28 to the threaded driving shaft 62.

Figure 5:
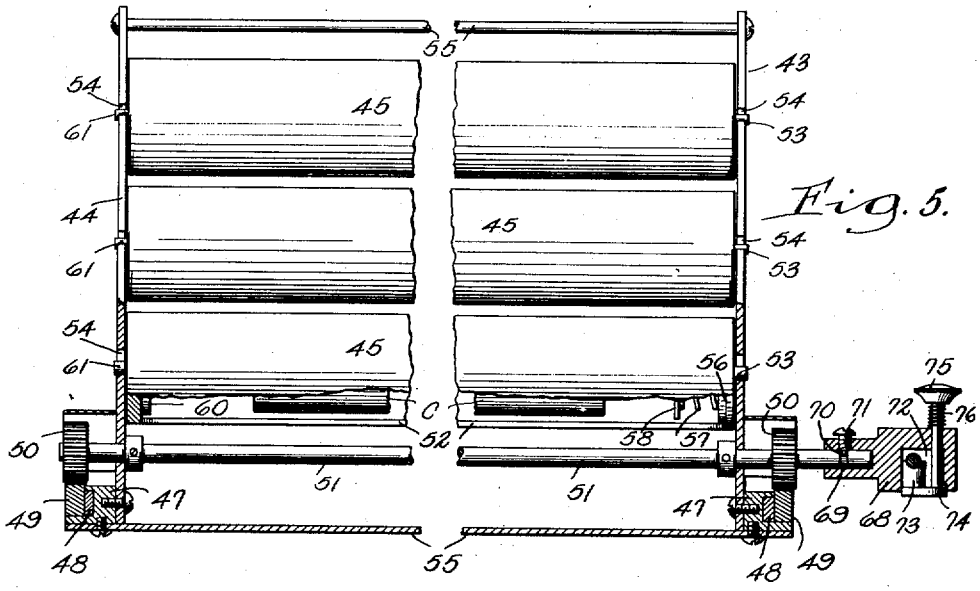
Fig. 5 is an enlarged vertical sectional view taken substantially on the lines 5—5 of Figs. 3 and 4, parts being shown in elevation and parts being broken away.

The threaded part of the driving shaft 62 is operatively connected to the carbon supply carriage 43 so as to effect feeding movement thereof to feed the carbon strips slowly toward the platen during feeding of the record strips. As best shown in Figs. 3 and 5, this driving connection includes a coupling head 68 recessed to rotatably receive the adjacent end of the equalizer shaft 51. The connecting end of this shaft has a circumferential groove 69 receiving the connecting lug 70 of the connecting screw 71. Thus the coupling head 68 is firmly attached to the end of the shaft 51 so as to transmit tractive effort to the carbon carriage, while free relative rotation of the shaft and head is permitted by means of the connection described.

At its underside the coupling head 68 has a recess 72 in which a driving half nut 73 is mounted for vertical sliding movement and is restrained against lateral movements by engagement with the walls of the recess 72. This driving member or half nut 73 is provided at its upper surface with a semi-cylindrical recess threaded for driving engagement with the threads of the driving shaft 62. An operating pin 74 is mounted for sliding movement in the coupling head, being connected at its lower end with a connecting extension of the half nut 73. The upper end of the operating pin has an operating button 75 beneath which a spiral spring 76 is compressed in such a manner as to urge the operating half nut into operative engagement with the threads of the shaft 62. This structure provides a releasable coupling in the driving connections for the carbon carriage 43. This coupling may be very readily released by pressure upon the button 75 and set again at any desired operating position along the length of the operating threads of the shaft 62.

Figure 8:
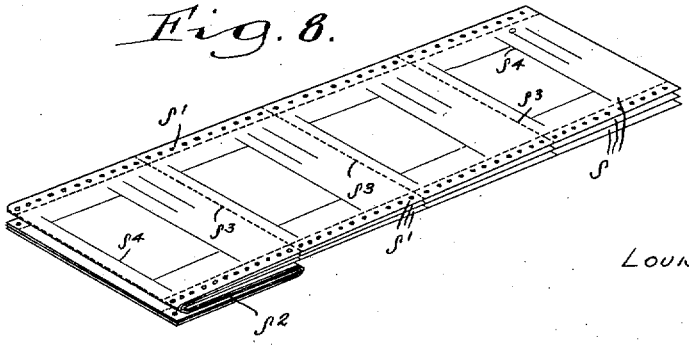
Fig. 8 is a perspective view of an assembly of record strips such as used in machines of this type.

An assembly of record strips S adapted for being fed in the machine above described is shown in Fig. 8. There may be as many strips S in the assembly as desired and the strips are provided with apertured feed bands S′ along each of the longitudinal marginal portions thereof for engagement with the feed pins 34. The complete strip assembly is for convenience zigzag folded along transverse lines into zigzag folded supply pad $S^2$. Each strip S is ordinarily provided with longitudinally spaced transverse weakened severance lines $S^3$ formed by perforations, scores, slits or the like along which the strip may be severed into form sheets or leaves, each having a blank form $S^4$.

An illustrative embodiment of the invention having been fully set forth above, the operation will be briefly reviewed. The record strips S are led from the zigzag supply pad $S^2$ over the carbon cylinders or housings 45 which thus act as strip guides, and thence to the guiding channels between the guiding plates 42 on the vertically movable platen frame. At the same time, the carbon strips C, in this instance two, are led from the supply rolls 46 in the housings 45 and interleaved in transfer relation with the record strips. These interleaved record and transfer strips are then led from the guiding channels in loose condition upwardly over the writing surface of the platen 16 and the forward ends of the record strips are engaged with their feed apertures over the feed pins 34 of the flexible feed chains 26. The forward ends of the carbon strips C terminate adjacent to or just beyond the platen 16 so as not to extend to the record strip feeding mechanism. The machine is now ready to begin the typing operation.

As the typing proceeds the pin feed mechanism is operated for line spacing by turning the knob 29 after each line has been written, thus feeding the record strips forwardly step by step in the usual manner. During this operation of the pin feed mechanism the threaded driving shaft 62 is rotated through operation of the bevelled gears 67, thus moving the carbon carriage 43 forwardly along the rails 48. Due to the threaded driving connection between the driving shaft 62 and the half nut 73, the feed of the carbon carriage and the carbon strips C will be very slow as compared with the feeding movement of the record strips. In the embodiment shown the carbon strips will be fed forwardly a distance substantially equal to the pitch of the threads of the driving shaft 62 at each complete revolution thereof. Although this feeding movement of the carbon strips is very slow it is sufficient to keep fresh transfer material in transfer position at all times at the platen 16; clear, legible transfer inscriptions are thus assured. Although the forward parts of the carbon strips are not positively fed into inscription position the friction of the feeding record strips upon these portions of the carbon strips is sufficient to carry the latter forwardly simultaneously with record strip feed to effect the feeding adjustment of the carbon strips at the platen. The record and carbon strips are not pressed tightly together at the platen and at the writing line thereof, being sufficiently loose at this point to permit the record strips to move forwardly with reference to the carbon strips, relative sliding movement of the record strips over the carbon strips occurring during this feeding. In this connection it will be noted that the record and transfer strips will be maintained in sufficiently loose condition at the writing platen and at the writing line thereof to permit the record strips to advance relatively to the transfer strips without imposing undue stresses upon the latter such as would tend to tear or otherwise damage them. This loose strip condition is maintained by several factors of this invention, chief of which are the tractor feed mechanism positioned beyond the platen and the strip guiding plates 42 between the strips opposite to the platen from the strip feed mechanism. The tractive effort or pull of the feed mechanism on the record strips is directed longitudinally substantially along the length of the writing surface of the platen 16 and so nearly parallel thereto as to avoid undue strip pressure with consequent strip friction at the writing surface, while at the same time the strips are sufficiently close together at the writing line to assure good legible transfer inscription. Also the guide plates 42 are positioned closely adjacent to the opposite side of the platen from the strip feed mechanism between the strips, thus further promoting this loose condition of the record and transfer strips at the platen so as to avoid the difficulty mentioned with reference to undue friction between the strips at the writing surface of the platen such as would impede the differential feeding movements of the record and transfer strips at said writing surface and writing line of the platen. As soon as the typing is completed on a set of record form sheets the inscribed sheets may be severed from the complete record assembly along the weakened severance lines $S^3$.

When it is desired to sever the used and depleted end portions of the carbon strips C, these strips may be fed forwardly with the record strips and the used ends severed at the time of severing the record strips along the weakened lines $S^3$, or the strips may be severed to remove the end portions thereof by an appropriate cutting or tearing implement. The carbon strips ordinarily being of the one time type in which the paper is very thin, severance of the depleted ends can be effected quite readily at the time of severance of the record strips on the weakened lines $S^3$. In order to permit the forward ends of the carbon strips to be moved forwardly so that they can be severed, the carbon carriage 43 can be moved forwardly upon the supporting rails 48 by releasing the threaded driving coupling. This can be easily accomplished by depressing the operating button 45 to disengage the threads of the half nut 73 with the threads of the driving shaft 62. After severance of the carbon strips the carbon carriage 43 will then be retracted to its rearward position as shown in Fig. 4, the threaded coupling, of course, being released. During this rearward movement of the carbon carriage the forward ends of the carbon strips will be stopped abreast of the platen 16 by pressing the strips against the platen surface. During the remainder of the rearward movement of the carbon carriage the carbon strips C will be fed from the supply rolls 46 appropriate tension being maintained by the frictional engagement of the disks 58 of the housing against the end of the core 59. Ordinarily, as shown the carbon strips will be slightly narrower than the record strips so that the longitudinal marginal portions of the carbons do not overlap the feeding bands $S^1$ of the record strips.

When it is desired to renew the supply of carbon strip in any one of the housings 45 this may be very quickly and easily accomplished by removing the housing from its support in the carriage 43, whereupon the end piece or cover 56 can be taken off and a new supply inserted into the housing. When the housing cylinder is replaced its position with its exit slot 52 in downward position will be determined by engagement of the positioning lug 61 in the slot 54 of the supporting end bracket.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In a machine of the character described, in combination, a platen, means positioned beyond said platen in the direction of strip feed for feeding record strips past inscription receiving position on said platen, a transfer strip supply carriage mounted for movement toward and from said platen, a rotary threaded driving rod having threaded driving connection with said carriage, driving connections for driving said threaded rod by operation of said record strip feeding means so as to cause feeding movement of the transfer strip differentially with reference to record strip feed, and releasing means for said threaded driving connection for facilitating setting the same in different driving positions along said rod.

2. In a machine of the character described, in combination, a platen, means positioned beyond said platen in the direction of strip feed for feeding record strips past inscription receiving position on said platen, a transfer strip supply carriage, means for mounting said carriage for movement toward and from said platen and including spaced supporting rails with racks, pinions engaging said racks and mounted for unitary rotation on said carriage for maintaining the transfer strip in alignment with the record strips, a rotary threaded driving rod having threaded driving connection with said carriage, and driving connections for driving said threaded rod by operation of said record strip feeding means so as to cause feeding movement of the transfer strip differentially with reference to record strip feed.

3. In a machine of the character described, in combination, a platen, means for feeding record strips past inscription receiving position on said platen, a transfer strip supply carriage having one or more carbon strip supply housings extending transversely of the carriage and forming record strip guides for guiding the strips into writing position, means for mounting said carriage for movement toward and from said platen and including spaced supporting rails with racks inclined downwardly toward the platen, pinions engaging said racks and mounted on the carriage for unitary rotation, a rotary threaded driving rod having threaded driving connection with said carriage, and driving connections for driving said threaded rod by operation of said record strip feeding means.

4. In a machine of the character described, in combination, a platen, means positioned beyond said platen in the direction of strip feed for feeding record strips past inscription receiving position on said platen, a transfer strip supply carriage mounted for movement toward and from said platen, a rotary threaded driving rod having threaded driving connection with said carriage, driving connections for driving said threaded rod by operation of said record strip feeding means so as to cause feeding movement of the transfer strip differentially with reference to record strip feed, and releasing means for said threaded driving connection for facilitating setting the same in different driving positions along said rod, said releasing means for said driving connection including a coupling head connected to said supporting carriage, a threaded member mounted for movement to and from driving engagement with the threads of said driving rod, and controlling connections on said coupling head for controlling the coupling and uncoupling movements of said movable threaded member.

5. In a machine of the character described, in combination, an operatively stationary platen having a record strip supporting, substantially flat writing surface, strip feeding means including strip engaging traveling feed pins positioned beyond said platen in the direction of strip feed for feeding record strips past writing position on said flat writing surface with a pulling action directed longitudinally substantially along said flat surface so as to avoid undue strip pressure with consequent strip friction at said flat writing surface, transfer strip feeding means, and driving connections for driving said transfer strip feeding means for effecting feeding movement of the transfer strip differentially at said flat writing surface with reference to record strip feed.

6. In a machine of the character described, in combination, an operatively stationary platen having a record strip supporting, substantially flat writing surface, strip feeding means including strip engaging traveling feed pins positioned beyond said platen in the direction of strip feed for feeding record strips past writing position on said flat writing surface with a pulling action directed longitudinally substantially along said flat surface so as to avoid undue strip pressure with consequent strip friction at said flat writing surface, transfer strip feeding means, and driving connections for driving said transfer strip feeding means and being operatively connected for simultaneous operation with said record strip feeding means for causing feeding movement of the transfer strip differentially at said flat writing surface with reference to record strip feed.

7. In a machine of the character described, in combination, an operatively stationary platen having a record strip supporting, substantially flat writing surface, strip feeding means including strip engaging traveling feed pins positioned beyond said platen in the direction of strip feed for feeding record strips past writing position on said flat writing surface with a pulling action directed longitudinally substantially along said flat surface so as to avoid undue strip pressure with consequent strip friction at said flat writing surface, transfer strip feeding means causing feeding movement of the transfer strip differentially at said flat writing surface with reference to record strip feed, and strip guiding and controlling means positioned oppositely to said platen from said first mentioned feeding mechanism and including a series of spaced guide plates forming strip passageways terminating adjacent to said platen for relieving contact pressure of said record and transfer strips at said writing surface so as to promote said differential feeding of the transfer strip at said writing surface.

LOUIS F. HAGEMAN.